United States Patent
Katoh

(10) Patent No.: US 10,000,237 B2
(45) Date of Patent: Jun. 19, 2018

(54) DRIVING SUPPORT DEVICE FOR VEHICLE STEERING SYSTEMS IN LANE ASSIST AND COLLISION AVOIDANCE MODES

(71) Applicant: TOYOTA JIDOSHA KABUSHIKI KAISHA, Toyota-shi, Aichi (JP)

(72) Inventor: Masayuki Katoh, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/286,297

(22) Filed: Oct. 5, 2016

(65) Prior Publication Data

US 2017/0166254 A1    Jun. 15, 2017

(30) Foreign Application Priority Data

Dec. 11, 2015   (JP) ................................. 2015-241973

(51) Int. Cl.
| | |
|---|---|
| B62D 12/02 | (2006.01) |
| B62D 15/02 | (2006.01) |
| G05D 1/02 | (2006.01) |
| G08G 1/16 | (2006.01) |
| B62D 6/00 | (2006.01) |

(52) U.S. Cl.
CPC .......... B62D 15/0265 (2013.01); B62D 6/00 (2013.01); B62D 6/005 (2013.01); G05D 1/0214 (2013.01); G05D 1/0238 (2013.01); G08G 1/165 (2013.01); G08G 1/167 (2013.01); G05D 2201/02 (2013.01)

(58) Field of Classification Search
USPC .................... 701/1, 42, 301, 23, 36
See application file for complete search history.

(56) References Cited

U.S. PATENT DOCUMENTS

| | | | |
|---|---|---|---|
| 2003/0014162 A1* | 1/2003 | Sadano | B62D 1/286 701/1 |
| 2007/0091173 A1* | 4/2007 | Kade | B60W 50/14 348/119 |
| 2010/0094520 A1* | 4/2010 | Zagorski | B60T 7/22 701/70 |
| 2012/0123643 A1* | 5/2012 | Limpibuntering | B62D 1/286 701/42 |

(Continued)

FOREIGN PATENT DOCUMENTS

| | | |
|---|---|---|
| JP | 2004-237813 A | 8/2004 |
| JP | 2006-137263 A | 6/2006 |

(Continued)

*Primary Examiner* — Richard A Goldman
(74) *Attorney, Agent, or Firm* — Oliff PLC

(57) ABSTRACT

In a driving support device for a vehicle including a collision avoidance support system and a lane travel support system, a steering control amount is set while maintaining an appropriate relationship between both of the systems. This is by setting a lower upper limit value for the steering torque command during collision avoidance as compared to lane travel support. However, a gradient (i.e., rate of change) of the collision avoidance is set to be greater than a gradient of the lane travel support. As a result, the driving support device balances collision avoidance and lane travel support to have quick response during collision avoidance, and maintaining the ability to adapt to wide changes in road condition during lane travel support.

4 Claims, 10 Drawing Sheets

(56) References Cited

U.S. PATENT DOCUMENTS

| | | | |
|---|---|---|---|
| 2012/0203431 A1* | 8/2012 | Kojo | B62D 15/025 |
| | | | 701/41 |
| 2012/0283912 A1* | 11/2012 | Lee | B62D 1/286 |
| | | | 701/41 |
| 2012/0310504 A1* | 12/2012 | DuHadway | G01C 21/28 |
| | | | 701/93 |
| 2013/0151058 A1* | 6/2013 | Zagorski | B60W 30/09 |
| | | | 701/23 |
| 2013/0253770 A1* | 9/2013 | Nishikawa | B62D 6/003 |
| | | | 701/42 |
| 2015/0057891 A1* | 2/2015 | Mudalige | B60W 10/00 |
| | | | 701/42 |
| 2015/0291216 A1 | 10/2015 | Sato | |
| 2015/0344068 A1* | 12/2015 | Taniguchi | B62D 15/025 |
| | | | 701/41 |
| 2016/0107682 A1* | 4/2016 | Tan | B62D 6/00 |
| | | | 701/41 |
| 2017/0166254 A1* | 6/2017 | Katoh | B62D 15/0265 |
| 2017/0217477 A1* | 8/2017 | Akatsuka | B62D 5/0463 |
| | | | 701/42 |
| 2017/0235307 A1* | 8/2017 | Asakura | G05D 1/0061 |

FOREIGN PATENT DOCUMENTS

| | | |
|---|---|---|
| JP | 2012-116403 A | 6/2012 |
| JP | 2013-126823 A | 6/2013 |
| JP | 2014-142965 A | 8/2014 |
| WO | 2014/083649 A1 | 6/2014 |

* cited by examiner

DRIVING SUPPORT DEVICE FOR VEHICLE STEERING SYSTEMS IN LANE ASSIST AND COLLISION AVOIDANCE MODES

BACKGROUND OF THE INVENTION

1. Field of the Invention

The present invention relates to a driving support device for a vehicle including a function of supporting driving of a driver so that a vehicle avoids a collision with an obstacle existing ahead of the vehicle and a function of supporting the driving of the driver so that the vehicle travels along a lane.

2. Description of the Related Art

Hitherto, there has been known a driving support device for a vehicle for carrying out collision avoidance support control. The collision avoidance support control is control to decelerate an own vehicle through automatic braking when an obstacle with which the own vehicle is likely to collide is detected by a sensor, e.g., a camera sensor or a radar sensor. Moreover, for example, as proposed in Japanese Patent Application Laid-open No. 2012-116403, there is known a driving support device for a vehicle for carrying out, in addition to the automatic braking, collision avoidance support control of a type of operating an electric power steering device, thereby automatically steering an own vehicle toward a direction away from an obstacle.

On the other hand, as proposed in Japanese Patent Application Laid-open No. 2014-142965, there is known a driving support device for a vehicle for carrying out lane travel support control. The lane travel support control is, for example, control to detect left and right white lines on a road through a camera sensor, set a target travel line (e.g., a centerline at the center position of the left and right white lines) within a travel lane based on those left and right white lines, and applying a steering torque to a steering mechanism so that a travel position of an own vehicle is maintained in a vicinity of the target travel line, thereby supporting a steering operation of a driver. Moreover, there is also known lane travel support control of a type of sounding a buzzer when the own vehicle is likely to deviate to the outside of the travel lane (left and right white lines), and applying a steering torque to the steering mechanism so that the own vehicle returns to within the travel lane. The former lane travel support control is generally referred to as lane keep assist control. The latter lane travel support control is generally referred to as lane departure prevention control.

Incidentally, there is conceived a driving support device for a vehicle incorporating both the collision avoidance support system for carrying out the collision avoidance support control through the automatic steering and the lane travel support system for carrying out the lane travel support control. Both of the support systems support the driving of the driver by carrying out the steering control for the steered wheels, but have different purposes of control from each other. Thus, a steering control amount when the steering control is carried out in the driving support device including both of the systems needs to be set while maintaining an appropriate relationship between both of the systems.

SUMMARY OF THE INVENTION

The present invention has been made in view of the above-mentioned problem, and therefore has an object to set, in a driving support device for a vehicle including the collision avoidance support system and the lane travel support system, the steering control amount while maintaining an appropriate relationship between both of the systems.

In order to achieve the above-mentioned object, a feature of one embodiment of the present invention resides in a driving support device for a vehicle, including:

a collision avoidance support system including:
  obstacle detection means (14) for detecting an obstacle existing ahead of an own vehicle;
  first command value calculation means (11) for calculating, when the own vehicle is likely to collide with the detected obstacle, a first steering control command value ($Tr1(n)$) representing a control amount of a steered wheel for avoiding the collision; and
  collision avoidance control means (30) for carrying out steering control for the steered wheel in accordance with the first steering control command value; and a lane travel support system including:
  lane detection means (14) for detecting a lane in which the own vehicle is traveling;
  second command value calculation means (12) for calculating a second steering control command value ($Tr2(n)$) representing a control amount of the steered wheel for maintaining a travel of the own vehicle along the lane based on a departure amount representing a degree of departure of the own vehicle from the detected lane; and
  lane travel control means (30) for carrying out steering control for the steered wheel in accordance with the second steering control command value, in which:
    the first command value calculation means has such a first calculation characteristic that an upper limit value of the first steering control command value is set to a first upper limit value ($Trmax1$), and an increase gradient per unit period until the first steering control command value reaches the first upper limit value is set to a first gradient ($K1$);
    the second command value calculation means has such a second calculation characteristic that an upper limit value of the second steering control command value is set to a second upper limit value ($Trmax2$), and an increase gradient per unit period until the second steering control command value reaches the second upper limit value is set to a second gradient ($K2$); and
      the first upper limit value is set to a value less than the second upper limit value ($Trmax1 < Trmax2$), and the first gradient is set to a value more than the second gradient ($K1 > K2$).

The one embodiment of the present invention includes the collision avoidance support system and the lane travel support system, and uses those systems to support the driving of the driver. The collision avoidance support system includes the obstacle detection means, the first command value calculation means, and the collision avoidance control means. The obstacle detection means is configured to detect an obstacle existing ahead of the own vehicle. The first command value calculation means is configured to calculate, when the own vehicle is likely to collide with the obstacle, the first steering control command value representing the control amount of the steering wheel for avoiding the collision. For example, the first command value calculation means is configured to set a first target steering control amount for avoiding a collision, and calculate the first steering control command value every time predetermined calculation period elapses so that the control amount of the steered wheel approaches the first target steering control amount. As the control amount of the steered wheel (steering control amount), for example, a steering torque or a steering angle may be used. The collision avoidance control means is configured to carry out the steering control for the steered wheel in accordance with the first steering control command value. As a result, the collision avoidance support system uses, when the own vehicle is likely to collide with an obstacle, the steering control to change the travel direction of the own vehicle, thereby supporting the driving of the driver so that the own vehicle avoids the collision with the obstacle.

The lane travel support system includes the lane detection means, the second command value calculation means, and the lane travel control means. The lane detection means is configured to detect the lane in which the own vehicle is traveling. The second command value calculation means is configured to calculate the second steering control command value representing the control amount of the steered wheel for maintaining the travel of the own vehicle along the lane based on the departure amount representing the degree of departure of the own vehicle from the detected lane. For example, the second command value calculation means is configured to set a second target steering control amount for the own vehicle to maintain the travel along the lane, and calculate the second steering control command value every time predetermined calculation period elapses so that the control amount of the steered wheel approaches the second target steering control amount. The lane travel control means is configured to carry out the steering control for the steered wheel in accordance with the second steering control command value. As a result, the lane travel support system uses, when the own vehicle deviates from the lane, the steering control to change the travel direction of the own vehicle, thereby supporting the driving of the driver so that the own vehicle can maintain the travel along the lane.

The steering control carried out in the lane travel support system may be steering control of controlling the steering so that the travel position of the own vehicle is maintained in the vicinity of the target travel line or steering control of controlling the steering so that the own vehicle does not deviate to the outside of the travel lane (left and right white lines).

When the driving support device includes the collision avoidance support system and the lane travel support system, the steering control amount needs to be set in such a manner that an appropriate relationship between both of the systems is maintained. The collision avoidance support system is a system for carrying out the steering control so as to avoid a collision of the own vehicle with an obstacle, and when a start timing of the steering operation (referred to as automatic steering) is too early, the automatic steering interferes with the steering wheel operation performed by the driver. In this case, the driver may feel a sense of discomfort. Thus, in the collision avoidance support system, it is preferable that the automatic steering be started at a timing at which the obstacle and the own vehicle are considerably close to each other. Therefore, when the automatic steering is carried out, the steered wheels need to be quickly steered. Moreover, when the automatic steering is carried out, the own vehicle needs not only to avoid an obstacle targeted by the collision avoidance, but also to avoid interfering with travel of another vehicle or the like existing around the own vehicle, the interfering being due to the path change of the own vehicle. Therefore, a final steering amount needs to be appropriately restricted.

On the other hand, the lane travel support system is a system for carrying out the steering control so that the own vehicle travels along a road. The steering control needs to be carried out based on an entire road shape extending to a far position, without excessively depending on a road shape immediately before the own vehicle. Thus, the lane travel support system does not need to steer the steered wheel as quickly as the collision avoidance support system. Moreover, the lane travel support system is not operated in an emergency, which is different from the case of the collision avoidance support system, and when the steered wheels are quickly steered by the lane travel support system, the driver tends to feel the sense of discomfort. Moreover, when the steering control is carried out by the lane travel support system, a large amount of steering sometimes needs to be carried out in accordance with a road shape.

Thus, according to the present invention, the first command value calculation means has such a first calculation characteristic that the upper limit value of the first steering control command value is set at the first upper limit value, and the increase gradient per unit period until the first steering control command value reaches the first upper limit value is set at the first gradient. On the other hand, the second command value calculation means has such a second calculation characteristic that the upper limit value of the second steering control command value is set at the second upper limit value, and the increase gradient per unit period until the second steering control command value reaches the second upper limit value is set at the second gradient. The first upper limit value is set at the value less than the second upper limit value, and the first gradient is set at the value more than the second gradient.

Thus, when the steering is carried out by the collision avoidance support system, compared with when the steering is carried out by the lane travel support system, the steering control amount can be quickly increased, and the final steering control amount can be restricted so as not to be excessively large. As a result, the collision avoidance can be carried out responsively for an obstacle that suddenly appears or the like. Moreover, the interference between the automatic steering and the steering wheel operation performed by the driver is less likely to occur, and it is unlikely that the driver feels the sense of discomfort. Moreover, the own vehicle is unlikely to interfere with peripheral vehicles and the like other than the collision avoidance subject.

Moreover, when the steering is carried out by the lane travel support system, compared with when the steering is carried out by the collision avoidance support system, the steering control amount can be increased over a period, and the final steering control amount can become large. As a result, it is unlikely that the driver feels the sense of discomfort. Moreover, the own vehicle can be controlled to travel appropriately along the road shape.

A feature of one aspect of the present invention resides in a driving support device for a vehicle, including inhibition means (S14) for inhibiting the steering control for the steered wheel by the lane travel support system when the steering control for the steered wheel by the collision avoidance support system is carried out.

In the configuration including the collision avoidance support system and the lane travel support system, the steering control carried out by both of the systems may interfere with each other. Thus, according to the one aspect of the present invention, the inhibition means is provided. The inhibition means is configured to inhibit the steering control for the steered wheel by the lane travel support system when the steering control for the steered wheel is carried out by the collision avoidance support system. Thus, when the own vehicle is likely to collide with an obstacle, the steering control by the collision avoidance support system is prioritized. As a result, the driver can appropriately receive the collision avoidance support.

A feature of one aspect of the present invention resides in a driving support device for a vehicle, in which the first command value calculation means is configured to set (S20, S21) the first steering control command value to one of a "value calculated in accordance with the first upper limit value and the first gradient" and a "value calculated in accordance with the second upper limit value and the second gradient", whichever is larger, when the steering control for the steered wheel is carried out by the collision avoidance support system.

According to the one aspect of the present invention, the first steering control command value is set to the larger one of the "value calculated in accordance with the first upper limit value and the first gradient" and the "value calculated in accordance with the second upper limit value and the second gradient", when the steering control for the steered wheel is carried out by the collision avoidance support system. Thus, even when the steering control by the lane travel support system is inhibited, there is provided the steering control amount which could be realized if the lane travel support system carried out the steering control. Thus, collision avoidance performance can be increased.

Moreover, the first gradient is more than the second gradient, and thus the first steering control command value does not increase immediately after the first steering control command value reaches the first upper limit value, and maintains the first upper limit value for a predetermined period. Therefore, a large steering control amount is finally provided by the collision avoidance support system, but a certain period before the first steering control command value reaches the second upper limit value is secured. As a result, a time margin for a collision avoidance operation required as a result of the path change of the own vehicle can be provided for drivers of peripheral vehicles other than the object with which collision is going to be avoided.

A feature of one aspect of the present invention resides in a driving support device for a vehicle, including selection means (19) capable of selecting any one of an operation mode for operating the lane travel support system and a non-operation mode for not operating the lane travel support system, in which, when the steering control for the steered wheel is carried out by the collision avoidance support system, the first command value calculation means is configured to set (S20, S21) the first steering control command value to one of a "value calculated in accordance with the first upper limit value and the first gradient" and a "value calculated in accordance with the second upper limit value and the second gradient", whichever is larger, under a state where the operation mode is selected, and set (S19) the first steering control command value to the value calculated in accordance with the first upper limit value and the first gradient under a state where the non-operation mode is selected.

According to the one aspect of the present invention, the selection means is provided, and can select any one of the operation mode in which the lane travel support system is operated and the non-operation mode in which the lane travel support system is not operated. The steering control for the steered wheel by the lane travel support system is inhibited when the steering control for the steered wheel is carried out by the collision avoidance support system even when the operation mode is selected.

The first steering control command value is set to the larger one of the "value calculated in accordance with the first upper limit value and the first gradient" and the "value calculated in accordance with the second upper limit value and the second gradient" when the steering control for the steered wheel is carried out by the collision avoidance support system under the state where the operation mode is selected. On the other hand, the first steering control command value is set to the "value calculated in accordance with the first upper limit value and the first gradient" when the steering control for the steered wheel is carried out by the collision avoidance support system under the state where the non-operation mode is selected.

Thus, even when the steering control by the lane travel support system is inhibited under the state where the operation mode is selected, there is provided the steering control amount which could be realized if the lane travel support system carried out the steering control. Thus, the collision avoidance performance can be increased. Moreover, the first gradient is more than the second gradient, and thus the first steering control command value does not increase immediately after the first steering control command value reaches the first upper limit value, and maintains the first upper limit value for the predetermined period. Therefore, a large steering control amount is finally provided by the collision avoidance support system, but the period before the first steering control command value reaches the second upper limit value is secured. As a result, a time margin for a collision avoidance operation required as a result of the path change of the own vehicle can be provided for drivers of peripheral vehicles other than the object with which collision is going to be avoided.

In the above description, reference numerals used in the embodiment of the present invention are enclosed in parentheses and are assigned to each of the constituent features of the invention corresponding to the embodiment in order to facilitate understanding of the invention. However, each of the constituent features of the invention is not limited to the embodiment defined by the reference numerals.

DETAILED DESCRIPTION OF THE PREFERRED EMBODIMENT

Figure 1:
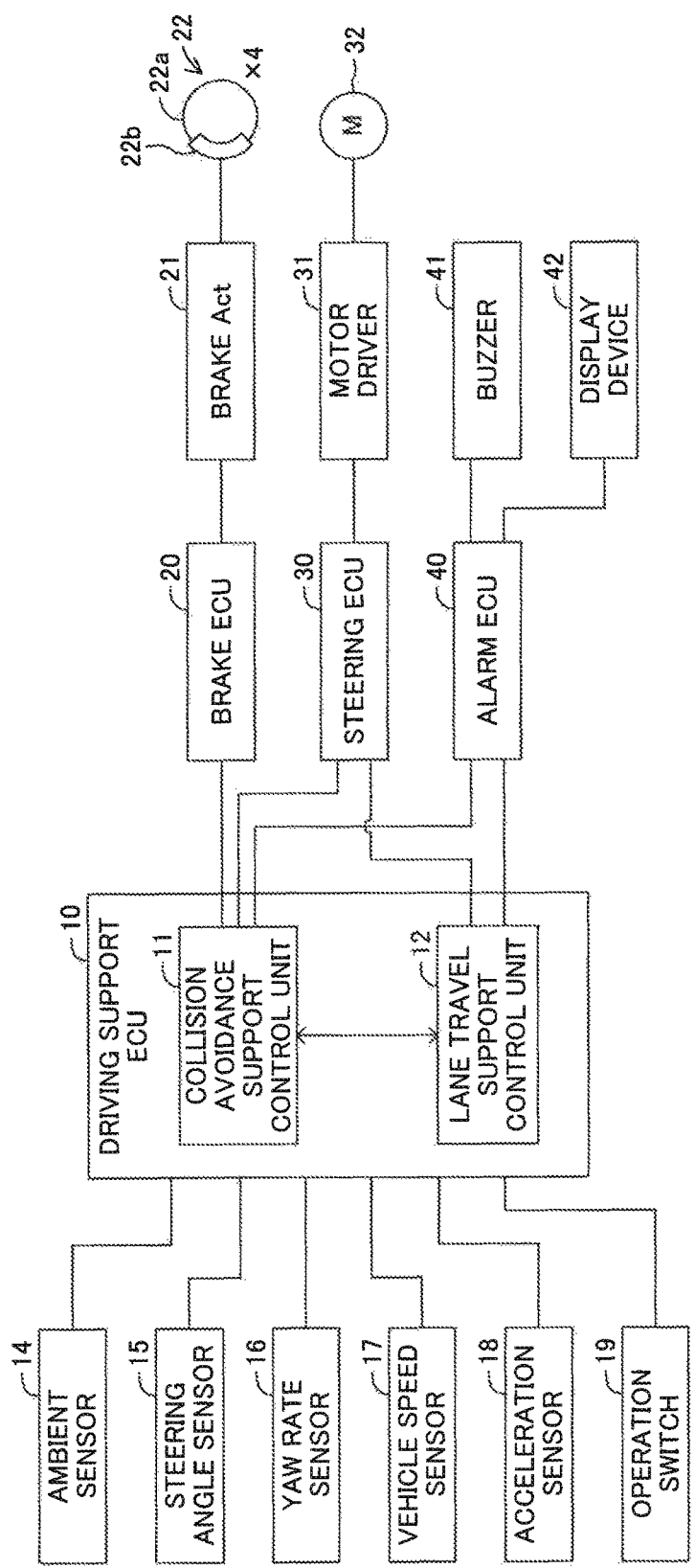
FIG. 1 is a schematic system configuration diagram for illustrating a driving support device for a vehicle according to an embodiment of the present invention.

Referring to the accompanying drawings, an embodiment of the present invention is described in detail below. FIG. 1 is a schematic system configuration diagram for illustrating a driving support device for a vehicle according to this embodiment.

The driving support device for a vehicle (hereinafter simply referred to as driving support device) includes a driving support ECU 10, a brake ECU 20, a steering ECU 30, and an alarm ECU 40. Each of the ECUs 10, 20, 30, and 40 includes a microcomputer as a main component, and are mutually connected with one another via a controlled area network (CAN) (not shown) for transmitting and receiving data to and from one another. "ECU" is an abbreviation of electric control unit. The microcomputer herein includes a CPU and storage devices such as a ROM and a RAM, and the CPU is configured to implement various functions by executing instructions (programs) stored in the ROM. A vehicle on which the driving support device is installed is herein referred to as an "own vehicle".

The driving support ECU 10 is connected to an ambient sensor 14, a steering angle sensor 15, a yaw rate sensor 16, a vehicle speed sensor 17, an acceleration sensor 18, and an operation switch 19. The ambient sensor 14 has a function of acquiring information at least on a road existing ahead of the own vehicle, and 3D objects existing on the road. The 3D object represents a moving object (e.g., a pedestrian, a bicycle, and a motor vehicle), and a fixed object (e.g., an electric pole, a tree, and a guard rail).

The ambient sensor 14 includes, for example, a radar sensor and a camera sensor. The radar sensor is configured to radiate a radio wave in the millimeter band (referred to as millimeter wave) to the periphery (including at least the front side) of the own vehicle, and uses, when a 3D object that reflects the millimeter wave exists in the radiation range, a reflected wave to calculate a presence/absence of the 3D object and a relative relationship between the own vehicle and the 3D object (e.g., a distance between the own vehicle and the 3D object, and a relative speed between the own vehicle and the 3D object). The camera sensor includes, for example, a stereo camera, and is configured to take images of left and right scenes ahead of the own vehicle, and calculate the shape of the road, the absence/presence of a 3D object, and the relative relationship between the own vehicle and the 3D object, based on the taken left and right image data. Moreover, the camera sensor is configured to recognize a lane marker (hereinafter referred to as a white line), e.g., the left and right white lines of the road, the shape of the road, and a positional relationship between the road and the own vehicle.

The information acquired by the ambient sensor 14 is referred to as object information. The ambient sensor 14 is configured to repeatedly transmit the object information to the driving support ECU 10 with a predetermined period. The ambient sensor 14 does not always need to include the radar sensor and the camera sensor, and may include, for example, only the camera sensor. Moreover, as the information representing the shape of the road on which the own vehicle travels and the positional relationship between the road and the own vehicle, information provided by a navigation system may be used.

The steering angle sensor 15 is configured to detect the steering angle of the own vehicle, and transmit a detection signal of the steering angle to the driving support ECU 10. The yaw rate sensor 16 is configured to detect the yaw rate acting on the own vehicle, and transmit a detection signal of the yaw rate to the driving support ECU 10. The vehicle speed sensor 17 is configured to detect the travel speed (referred to as vehicle speed) of the own vehicle, and transmit a detection signal of the vehicle speed to the driving support ECU 10. The acceleration sensor 18 is configured to detect a longitudinal acceleration, which is an acceleration acting in a longitudinal direction of the own vehicle, and a lateral acceleration, which is an acceleration acting in a lateral direction (vehicle width direction) of the own vehicle, and transmit detection signals of the accelerations to the driving support ECU 10. The vehicle speed sensor 17 may be a wheel rotational speed sensor.

The operation switch 19 is a selection operation device configured to enable the driver to select a control mode from control modes carried out by a lane travel support system described later. With the operation switch 19, one of a mode (referred to as a first operation mode) in which lane keep assist control and lane departure prevention control are carried out, a mode (referred to as a second operation mode) in which the lane keep assist control is not carried out, and only the lane departure prevention control is carried out, and a mode (referred to as a non-operation mode) in which neither of the lane keep assist control and the lane departure prevention control is carried out, can be selected. Both the first operation mode and the second operation mode are generally referred to as an operation mode. Each of those support controls is described later.

The driving support ECU 10 includes a collision avoidance support control section (part) 11 and a lane travel support control section (part) 12. According to the present embodiment, the collision avoidance support control section 11 and the lane travel support control section 12 are provided in the common driving support ECU 10, but may be configured to be respectively provided in ECUs independent of each other. The collision avoidance support control section 11 and the lane travel support control section 12 are connected to each other for mutual transmission/reception. A description is later given of functions of the respective control sections 11 and 12 in the driving support ECU 10.

The brake ECU 20 is connected to the brake actuator 21. The brake actuator 21 is provided in a hydraulic circuit between a master cylinder (not shown) configured to pressurize a working fluid with a depressing force on a brake pedal and friction brake mechanisms 22 provided on the front/rear left/right wheels. The friction brake mechanism 22 includes a brake disk 22a fixed to the wheel and a brake caliper 22b fixed to a vehicle body. The friction brake mechanism 22 is configured to use a hydraulic pressure of the working fluid supplied from the brake actuator 21 to operate a wheel cylinder built into the brake caliper 22b so as to press brake pads to the brake disk 22a, thereby generating a friction braking force.

The brake actuator 21 is a publicly known actuator configured to adjust the hydraulic pressure in the wheel cylinders integrated into the brake calipers 22b based on a control command from the brake ECU 20, thereby generating braking forces on the front/rear left/right wheels.

The steering ECU 30 is a control device for an electric power steering system, and is connected to a motor driver 31. The motor driver 31 is connected to a steering motor 32. The steering motor 32 is built into a steering mechanism (not shown), and is configured to use electric power supplied from the motor driver 31 to rotate a rotor, thereby steering the left and right steered wheels through the rotation of the rotor. The steering ECU 30 is configured to detect a steering torque of the driver, and generate an assist torque corresponding to the detected steering torque using the steering motor 32, in a usual state. On the other hand, when a steering control command value (steering torque command value Tr(n) described later) transmitted from the driving support ECU 10 is received while the driver is not operating the steering wheel, the steering ECU 30 is configured to control/drive the steering motor 32 in accordance with the steering control command value, thereby steering the steered wheels.

The alarm ECU 40 is connected to a buzzer 41 and a display device 42. The alarm ECU 40 is configured to sound the buzzer 41 in accordance with the command from the driving support ECU 10, thereby alerting the driver, and use the display device 42 to display an operation state of the driving support control.

A description is now given of the driving support ECU 10. The driving support device according to the present embodiment includes a collision avoidance support system and a lane travel support system. The collision avoidance support control section 11 in the driving support ECU 10 serves as a main unit configured to calculate a control amount for controlling an operation of the collision avoidance support system. The lane travel support control section 12 in the driving support ECU 10 servers as a main unit configured to calculate a control amount for controlling an operation of the lane travel support system.

The collision avoidance support system is constructed by the collision avoidance support control section 11 provided in the driving support ECU 10, the above-mentioned sensors 14, 15, 16, 17, and 18, the brake ECU 20 (including the brake actuator 21 and the friction brake mechanisms 22), the steering ECU 30 (including the motor driver 31 and the steering motor 32), and the alarm ECU 40 (including the buzzer 41 and the display device 42).

Moreover, the lane travel support system is constructed by the lane travel support control section 12 provided in the driving support ECU 10, the above-mentioned sensors 14, 15, 16, 17, and 18, the operation switch 19, the steering ECU 30 (including the motor driver 31 and the steering motor 32), and the alarm ECU 40 (including the buzzer 41 and the display device 42).

First, a description is given of the collision avoidance support control section 11 serving as a center of the collision avoidance support system.

The collision avoidance support control section 11 is configured to generate, with a predetermined calculation period, information on a road on which the own vehicle will travel from a present point in time based on the object information transmitted from the ambient sensor 14. For example, the collision avoidance support control section 11 is configured to generate coordinate information (position information) on a ground, 3D objects, and the white lines, using a coordinate system extending from an origin in a lateral direction and a forward direction of the own vehicle, wherein a center position on a front end of the own vehicle is defined as the origin. As a result, the collision avoidance support control section 11 recognizes/acquires a shape of a travel lane of the own vehicle, the travel lane partitioned by the left and right white lines, a position and a direction of the own vehicle within the travel lane, and relative positions of the 3D objects with respect to the own vehicle.

The collision avoidance support control section 11 is configured to calculate a turn radius of the own vehicle based on the yaw rate detected by the yaw rate sensor 16 and the vehicle speed detected by the vehicle speed sensor 17, and calculate a trajectory of the own vehicle based on the turn radius. The collision avoidance support control section 11 is configured to determine whether a 3D object is a moving object or a stationary object based on a change in the position of the 3D object, and calculate a trajectory of the 3D object when the 3D object is determined to be a moving object. For example, a moving speed in the longitudinal direction (travel direction of the own vehicle) of the 3D object can be calculated based on the vehicle speed of the own vehicle and the relative speed between the own vehicle and the 3D object. A moving speed in the lateral direction of the 3D object can be calculated based on a change amount in a distance between a lateral end position of the 3D object and the white lines, both detected by the ambient sensor 14, or the like. The collision avoidance support control section 11 is configured to calculate the trajectory of the 3D object based on the moving speeds in the longitudinal direction and the lateral direction of the 3D object. Alternatively, the collision avoidance support control section 11 may be configured to calculate the trajectory of the 3D object based on the calculated trajectory of the own vehicle and the distance between the own vehicle and the 3D object detected by the ambient sensor 14.

The collision avoidance support control section 11 is configured to determine whether or not the own vehicle is likely to collide with the 3D object if the own vehicle travels while maintaining a current travel state of the own vehicle, based on the position of the 3D object and the trajectory of the own vehicle. When the 3D object is a moving object, the collision avoidance support control section 11 is configured to calculate a trajectory of the 3D object, and determine whether or not the own vehicle is likely to collide with the 3D object based on the trajectory of the 3D object and the trajectory of the own vehicle.

The collision avoidance support control section 11 is configured to recognize the 3D object as an obstacle when it determines that the own vehicle will collide with the 3D object based on the determination result. The collision avoidance support control section 11 is configured to calculate a time to collision TTC, which is an estimated period (remaining period until the collision) until the collision of the own vehicle with the obstacle, in accordance with Equation (1) based on a distance L between the obstacle and the own vehicle, and a relative speed Vr between the own vehicle and the obstacle.

$$TTC = L/Vr \quad (1)$$

The collision avoidance support control section 11 is configured to determine that the own vehicle is likely to collide with the obstacle when the time to collision TTC is equal to or less than a collision determination threshold TTC0 set in advance.

The collision avoidance support control section 11 is configured to calculate a target deceleration for decelerating the own vehicle when it is determined that the own vehicle is likely to collide with the obstacle. For example, assuming that the obstacle is stationary, a travel distance X until the own vehicle stops is represented by Equation (2), where, at the current time point, the speed (=relative speed) of the own vehicle is V, the deceleration of the own vehicle is a, and a period until the vehicle stops is t.

$$X = V \cdot t + (1/2) \cdot a \cdot t^2 \quad (2)$$

Moreover, the period t until the vehicle stops can be represented by Equation (3).

$$t = -V/A \quad (3)$$

Thus, the deceleration "a" required to stop the own vehicle after the travel distance D can be represented as Equation (4) by substituting Equation (3) into Equation (2).

$$a = -V^2/2D \quad (4)$$

In order to stop the vehicle before the obstacle by a distance β, the travel distance D should be set to a distance (L−β) acquired by subtracting the distance β from the distance L detected by the ambient sensor 14. When the obstacle is traveling, a relative speed and a relative deceleration with respect to the obstacle can be used to calculate the deceleration "a."

The collision avoidance support control section 11 is configured to set the deceleration "a" calculated in this way to a target deceleration. In this case, the deceleration that can be generated by the vehicle is limited (e.g., approximately −1 G), and when the absolute value of the calculated target deceleration is larger than the absolute value of an upper limit value amax set in advance, the target deceleration is set to the upper limit value amax. The collision avoidance support control section 11 is configured to transmit a brake command for the collision avoidance representing the target deceleration to the brake ECU 20. As a result, the brake ECU 20 controls the brake actuator 21 in accordance with the target deceleration to generate friction braking forces on the wheels. The automatic braking operates in this way, to thereby decelerate the own vehicle.

The collision avoidance support control section 11 is configured to transmit an alert command to the alarm ECU 40 prior to the operation of the automatic braking. As a result, the alarm ECU 40 sounds the buzzer 41, and displays a predetermined message, mark or the like on the display device 42, thereby alerting the driver.

Figure 2:
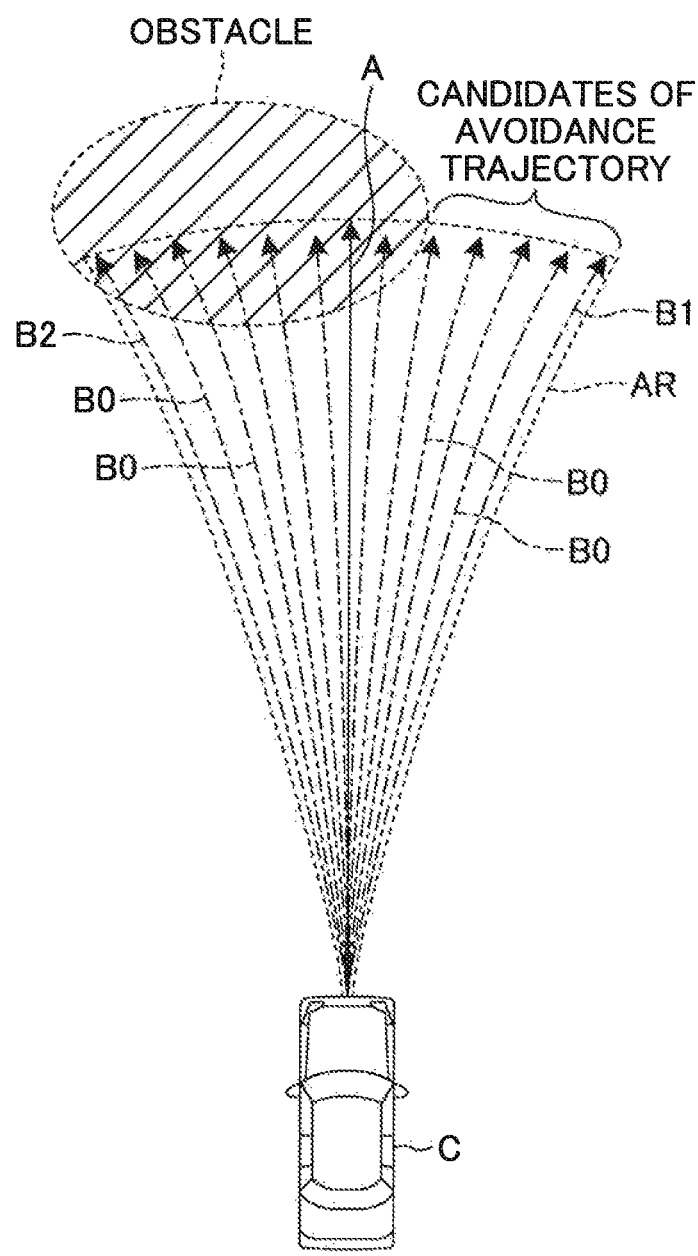
FIG. 2 is an explanatory diagram for illustrating candidates of an avoidance trajectory of an own vehicle.

The collision avoidance support control section 11 is configured to calculate an avoidance target trajectory that can be followed by the own vehicle to avoid the collision with the obstacle every time a predetermined calculation period elapses in parallel with the calculation of the target deceleration. For example, as illustrated in FIG. 2, the collision avoidance support control section 11 identifies a path A on which an own vehicle C is estimated to travel when the own vehicle C is assumed to travel while maintaining the current travel state. Then, the collision avoidance support control section 11 is configured to identify a path B1 on which the own vehicle C is estimated to travel when a maximum change amount ΔGy in the lateral acceleration at which the own vehicle C can safely turn at the current speed of the own vehicle C is added to a current lateral acceleration Gy0 of the own vehicle C, and identify a path B2 on which the own vehicle C is estimated to travel when the maximum change amount ΔGy is subtracted from the current lateral acceleration Gy0 of the own vehicle C.

The collision avoidance support control section 11 is configured to acquire paths B0 each for a case where the lateral acceleration is changed by a certain amount as candidates of the avoidance trajectory in a range AR (travel range) from the path B1 to the path B2. The collision avoidance support control section 11 is configured to identify, as the avoidance trajectory, a trajectory which enables the own vehicle C to avoid the collision with the obstacle by turning along the trajectory without the interference with the obstacle, and is the smallest in the lateral acceleration, based on degrees of interference of the candidates of the avoidance trajectory with the obstacle.

When the collision avoidance support control section 11 determines that the own vehicle is likely to collide with the obstacle even when the above-mentioned automatic braking is operated, the collision avoidance support control section 11 is configured to calculate a target yaw rate to have the own vehicle travel along the avoidance trajectory identified as described above. The collision avoidance support control section 11 is configured to calculate a target steering torque Tr1* that achieves the target yaw rate based on the target yaw rate. The collision avoidance support control section 11 is configured to store, in advance, a map (not shown) for setting the target steering torque Tr1* that increases as a difference between the target yaw rate and an actual yaw rate (value detected by the yaw rate sensor 16) increases, and refer to this map to calculate the target steering torque Tr1*. Those calculations are carried out every time predetermined calculation period elapses.

The collision avoidance support control section 11 is configured to calculate, after the calculation of the target steering torque Tr1*, a steering torque command value Tr1($n$), which increases toward the target steering torque Tr1*, and transmit the calculated steering torque command value Tr1($n$) to the steering ECU 30. The steering ECU 30 is configured to control switching devices of the motor driver 31, thereby controlling a current supply to the steering motor 32 so that the steering motor 32 generates a steering torque having a magnitude of the steering torque command value Tr1($n$) in accordance with the steering torque command value Tr1($n$). The own vehicle C travels along the avoidance trajectory by steering the steered wheels in this way, resulting in the avoidance of the collision with the obstacle.

The steering torque command value Tr1($n$) corresponds to a first steering control command value according to the present invention. Moreover, the collision avoidance support control section 11 configured to calculate the steering torque command value Tr1($n$) corresponds to first command value calculation means according to the present invention. Moreover, the steering ECU 30 configured to control the current supply to the steering motor 32 in accordance with the steering torque command value Tr1($n$) so as to steer the steered wheels corresponds to collision avoidance control means according to the present invention.

Figure 3:
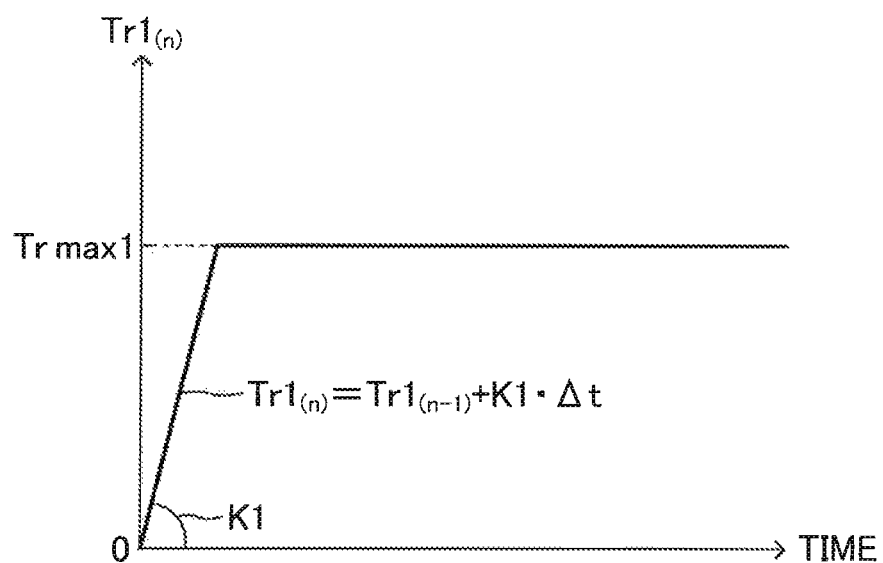
FIG. 3 is a graph for showing a first calculation characteristic.

The collision avoidance support control section 11 is configured to calculate the steering torque command value Tr1($n$) in accordance with a first calculation characteristic. As shown in FIG. 3, the first calculation characteristic is information for setting an upper limit value Trmax1 of the steering torque command value Tr1($n$), and a gradient K1 at which the steering torque command value Tr1($n$) increases, and is stored in the collision avoidance support control section 11. The steering torque command value Tr1($n$) is calculated every time a predetermined calculation period elapses, and an increase amount of the steering torque command value Tr1($n$) per calculation period (Δt) is set to the gradient K1. Thus, the steering torque command value Tr1($n$) calculated for the current time is represented as Equation (5) where Tr1($n$−1) is the steering torque command value one calculation period before.

$$Tr1(n)=Tr1(n-1)+K1 \cdot \Delta t \qquad (5)$$

Moreover, the steering torque command value Tr1($n$) is limited by an upper limit value so as not to be more than the upper limit value Trmax1.

Thus, when a collision avoidance request is generated through/using the steering (i.e., when the collision is determined to be impossible to avoid only through the automatic braking), the steering torque command value Tr1($n$) is calculated so as to increase at the gradient K1, thereby approaching the target steering torque Tr1*, and stops increasing when the steering torque command value Tr1($n$) reaches the target steering torque Tr1*. Moreover, the steering torque command value Tr1($n$) stops increasing when the steering torque command value Tr1($n$) reaches the upper limit value Trmax1 when the target steering torque Tr1* is more than the upper limit value Trmax1. A gradient for decreasing the steering torque command value Tr1($n$) may have the same absolute value as the gradient K1, or may be determined to be a different value.

When the collision is determined to be impossible to avoid only through the automatic braking, the travel direction of the own vehicle is changed by the automatic steering to support the driving of the drivers so as to avoid the collision of the own vehicle with an obstacle in the collision avoidance support system in the above manner. The control carried out by the collision avoidance support system is hereinafter referred to as collision avoidance support control, and particularly, the control of carrying out the automatic steering for the collision avoidance is hereinafter referred to as collision avoidance steering control.

A description is now given of the lane travel support control section 12 serving as a center of the lane travel support system. The lane travel support control section 12 has a lane keep assist function and a lane departure prevention function. The lane keep assist function is a function of applying the steering torque to the steering mechanism so that the travel position of the own vehicle is maintained in a vicinity of the target travel line, thereby assisting the steering operation of the driver. The lane departure prevention function is a function of using the buzzer 41 and the display device 42 to alert the driver, and applying the steering torque to the steering mechanism so that the own vehicle does not deviate to the outside of the travel lane when the own vehicle is about to deviate to the outside of the travel lane (outside of the left and right white lines). The steering torque is different from a steering assist torque generated by the electric power steering system during the steering wheel operation performed by the driver in response to a steering wheel operation force, and represents the torque applied to the steering mechanism through the command from the lane travel support control section 12 independently of the steering wheel operation performed by the driver.

Control of operating the lane keep assist function is referred to as lane keep assist control. Control of operating the lane departure prevention function is referred to as lane departure prevention control. The lane keep assist control and the lane departure prevention control are generally referred to as lane travel support control. According to the present embodiment, the lane travel support control section 12 is configured to be able to carry out both the lane keep assist control and the lane departure prevention control, but may be configured to carry out only any one of those pieces of control.

The lane travel support control section 12 is configured to read the control mode set by the operation switch 19, and carry out the support control specified by the control mode. The lane travel support control section 12 is configured to carry out the lane keep assist control and the lane departure prevention control when the first operation mode is set, to carry out only the lane departure prevention control without carrying out the lane keep assist control when the second operation mode is set, and to carry out neither the lane keep assist control nor the lane departure prevention control when the non-operation mode is set.

Figure 4:
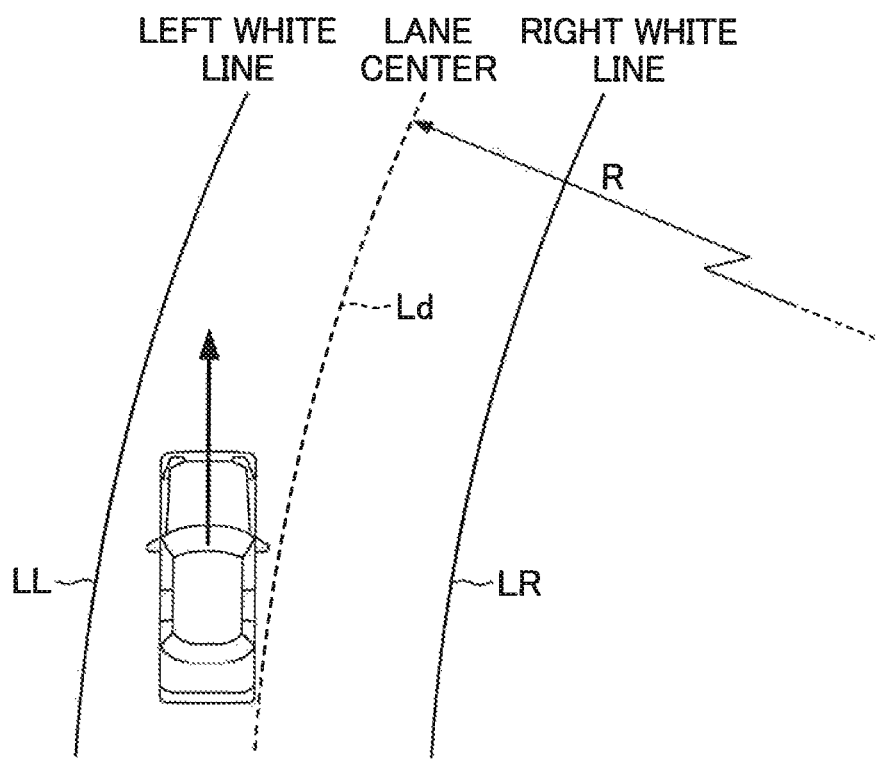
FIG. 4 is a plan view for illustrating left and right white lines LL and LR, a target travel line Ld, and a curve radius R.

The lane travel support control section 12 is configured to recognize the left and right white lines based on the object information transmitted from the ambient sensor 14, and determine the target travel line on which the own vehicle travels based on the left and right white lines. As illustrated in FIG. 4, for example, the lane travel support control section 12 is configured to detect a left white line LL and a right white line LR, and set a lane center line, which is at a center position between the left and right white lines, as a target travel line Ld. Moreover, the lane travel support control section 12 is configured to calculate a curve radius R of the target travel line Ld, and a position and a direction of the own vehicle in the travel lane partitioned by the left white line LL and the right white line LR.

Figure 5:
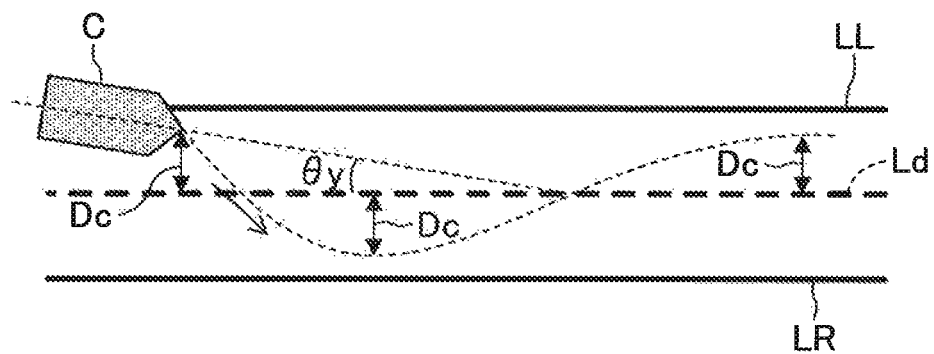
FIG. 5 is a plan view for illustrating the target travel line Ld, a center distance Dc, and a yaw angle θy when lane keep assist control is carried out.
Figure 6:
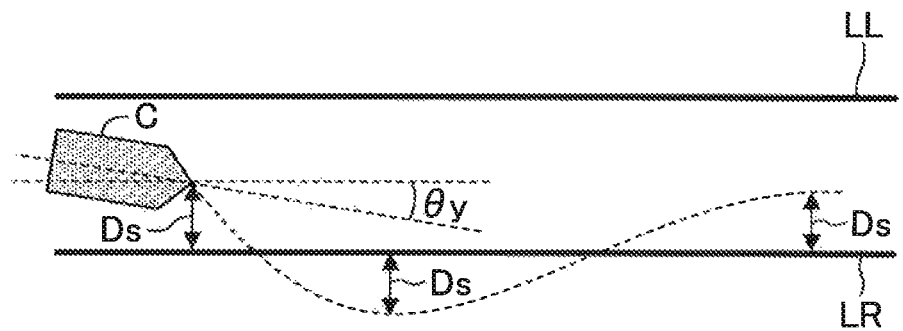
FIG. 6 is a plan view for illustrating the left white line LL (LR), a side distance Ds, and the yaw angle θy when lane departure prevention control is carried out.

As illustrated in FIG. 5, the lane travel support control section 12 is configured to calculate, when the lane keep assist control is carried out, a distance Dc (referred to as center distance Dc) between a center position at a front end of the own vehicle C and the target travel line Ld in a road widthwise direction, and a departure angle θy (hereinafter referred to as yaw angle θy) between the direction of the target travel line Ld and the travel direction of the own vehicle C. Moreover, as illustrated in FIG. 6, the lane travel support control section 12 is configured to calculate, when the lane departure prevention control is carried out, a distance Ds (referred to as side distance Ds) between the center position at the front end of the own vehicle C and the left white line LL or the right white line LR (right white line in the example of the diagram) in the road widthwise direction, and the yaw angle θy, which is the departure angle, between the direction of the target travel line Ld and the travel direction of the own vehicle.

The shape of the target travel line Ld can be calculated only under a state in which the left white line LL and the right white line LR are detected. Thus, the lane travel support control section 12 is configured to carry out the lane keep assist control and the lane departure prevention control when the first operation mode is selected and both of the left white line LL and the right white line LR are detected, and to carry out the lane departure prevention control based on the detected white line LL (LR) when only any one of the left white line LL and the right white line LR is detected.

Moreover, the lane travel support control section 12 is configured to carry out the lane departure prevention control based on the left white line LL and the right white line LR when the second operation mode is selected and the left white line LL and the right white line LR are detected, and to carry out the lane departure prevention control based on the detected white line LL (LR) when the second operation mode is selected and any one of the left white line LL and the right white line LR is detected. The lane keep assist control and the lane departure prevention control are not simultaneously carried out, and therefore, are switched therebetween in accordance with a predetermined condition.

The lane travel support control section 12 is configured to calculate, when the lane keep assist control is carried out, a target yaw rate $YRc^*$ every time a predetermined calculation period elapses based on the center distance Dc, the yaw angle θy, and a road curvature $\nu(=1/R)$ in accordance with Equation (6) described below.

$$YRc^* = K1 \times Dc + K2 \times \theta y + K3 \times \nu \qquad (6)$$

Here, K1, K2, and K3 are respectively control gains. The target yaw rate $YRc^*$ is a yaw rate set so that the own vehicle can travel along the target travel line Ld. The center distance Dc and the yaw angle θy represent degrees of departure of the own vehicle from the lane.

The lane travel support control section 12 is configured to detect, when the lane departure prevention control is carried out, the side distance Ds every time a predetermined calculation period elapses, and calculate, when the side distance Ds becomes less than a departure determination threshold Dsref, a target yaw rate $YRs^*$ every time a predetermined calculation period elapses in accordance with Equation (7) described below.

$$YRs^* = K4 \times Ds' + K6 \times \nu \qquad (7)$$

Here, K4, K5, and K6 are respectively control gains. The target yaw rate YRs* is a yaw rate set so that the own vehicle does not deviate to the outside of the white lines. Moreover, Ds' is set in correspondence to the side distance Ds, is set to a value that increases as the own vehicle deviates more outwardly from the white line when the own vehicle exists outside the white line targeted by the departure prevention, and is set to a value that decreases as the own vehicle moves more inwardly of the white line when the own vehicle exists inside the white line targeted by the departure prevention. For example, when the side distance Ds in the case where the own vehicle exists outside the white line targeted by the departure prevention is represented as a negative value, a value acquired by subtracting the side distance Ds from the departure determination threshold Dsref only needs to be set to Ds' (Ds'=Dsref−Ds). Ds' and the yaw angle θy represent degrees of the departure of the own vehicle from the lane.

The lane travel support control section 12 is configured to calculate, every time a predetermined calculation period elapses, a target steering torque Tr2* for providing/achieving the target yaw rate YR* based on the target yaw rate YR* (i.e., YRc* or YRs*). The lane travel support control section 12 is configured to store a map (not shown) for setting the target steering torque Tr2* that increases as a difference between the target yaw rate YR* and the actual yaw rate (value detected by the yaw rate sensor 16) increases, and refer to this map to calculate the target steering torque Tr2*.

The lane travel support control section 12 is configured to calculate, after the calculation of the target steering torque Tr2*, a steering torque command value Tr2(n), which increases toward the target steering torque Tr2*, and transmit the calculated steering torque command value Tr2(n) to the steering ECU 30. The steering ECU 30 is configured to control the current supply from the motor driver 31 to the steering motor 32 so that the steering motor 32 generates a steering torque having a magnitude of the steering torque command value Tr2(n) in accordance with the steering torque command value Tr2(n). The own vehicle C travels along the target travel line Ld (in the lane keep assist control) or travels so as not to deviate to the outside of the white lines of the travel lane (in the lane departure prevention control) by steering the steered wheels in this way.

The steering torque command value Tr2(n) corresponds to a second steering control command value according to the present invention. Moreover, the lane travel support control section 12 configured to calculate the steering torque command value Tr2(n) corresponds to second command value calculation means according to the present invention. Moreover, the steering ECU 30 configured to control the current supply to the steering motor 32 in accordance with the steering torque command value Tr2(n) so as to steer the steered wheels corresponds to lane travel control means according to the present invention.

The lane travel support control section 12 is configured to calculate the steering torque command value Tr2(n) in accordance with a second calculation characteristic. As shown by the solid line in FIG. 7, the second calculation characteristic is information for setting an upper limit value Trmax2 of the steering torque command value Tr2(n), and a gradient K2 for increasing the steering torque command value Tr2(n), and is stored in the lane travel support control section 12 and the collision avoidance support control section 11. The steering torque command value Tr2(n) is calculated every time predetermined calculation period elapses, and an increase amount of the steering torque command value Tr2(n) per calculation period (Δt) is set to the gradient K2. Thus, the steering torque command value Tr2(n) calculated for the current time is represented as Equation (8) where Tr2(n−1) is the steering torque command value one calculation period before.

$$Tr2(n)=Tr2(n-1)+K2 \cdot \Delta t \qquad (8)$$

Moreover, the steering torque command value Tr2(n) is limited by an upper limit value so as not to be more than the upper limit value Trmax2.

Thus, when a lane keep request or a lane departure prevention request is generated through the steering, the steering torque command value Tr2(n) is calculated so as to increase at the gradient K2, thereby approaching the target steering torque Tr2*, and stops increasing when the steering torque command value Tr2(n) reaches the target steering torque Tr2*. Moreover, the steering torque command value Tr2(n) stops increasing when the steering torque command value Tr2(n) reaches the upper limit value Trmax2 in a case where the target steering torque Tr2* is more than the upper limit value Trmax2. A gradient for decreasing the steering torque command value Tr2(n) may have the same absolute value as the gradient K2, or may be determined to be a different value.

Figure 7:
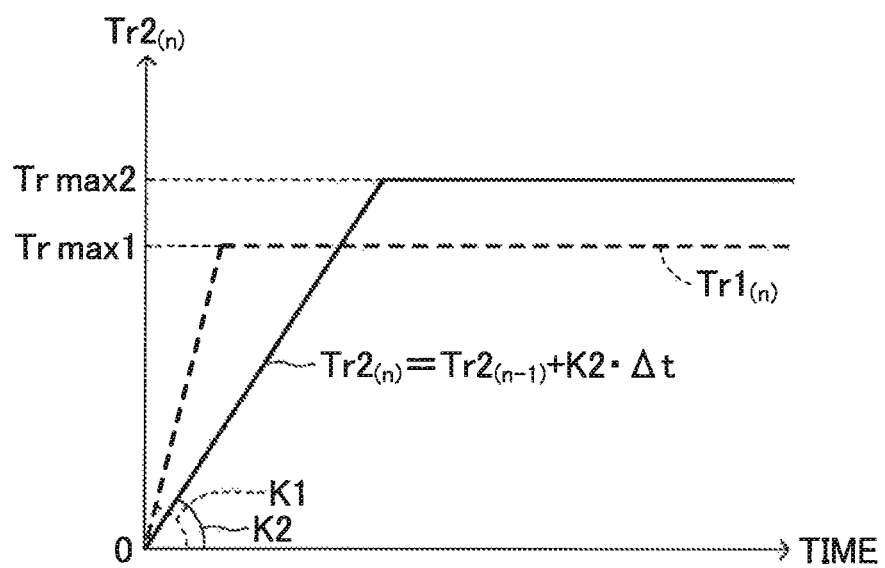
FIG. 7 is a graph for showing a second calculation characteristic.

In FIG. 7, the broken line represents the first calculation characteristic (characteristic shown in FIG. 3) for comparison. As appreciated from this chart, the upper limit value Trmax1 set by the first calculation characteristic is set to a value less than the upper limit value Trmax2 set by the second calculation characteristic (Trmax1<Trmax2), and the gradient K1 set by the first calculation characteristic is set to a value more than the gradient K2 set by the second calculation characteristic (K1>K2).

According to the present embodiment, the common second calculation characteristic is used to calculate the steering torque command value Tr2(n) in both the lane keep assist control and the lane departure prevention control, but second calculation characteristics independent of each other may be used to calculate the steering torque command value Tr2(n). Even in this case, the magnitude relationship of the upper limit value and the magnitude relationship of the gradient between the first calculation characteristic and the second calculation characteristic are respectively set as Trmax1<Trmax2 and K1>K2 as described above.

Moreover, when the lane travel support control section 12 transmits the steering torque command value Tr2(n) to the steering ECU 30, the lane travel support control section 12 simultaneously transmits the alert command to the alarm ECU 40. As a result, the alarm ECU 40 sounds the buzzer 41, and displays the predetermined message or mark on the display device 42, thereby alerting the driver.

A description is now given of a reason why the calculation characteristic for the collision avoidance steering control used to calculate the steering command torque is different from the calculation characteristic for the lane travel support control used to calculate the steering command torque. When the driving support device includes the collision avoidance support system and the lane travel support system, the steering control amount needs to be set while maintaining an appropriate relationship between both of the systems.

The collision avoidance steering control carried out by the collision avoidance support system is the control of steering the steered wheels so as to avoid a collision of the own vehicle with an obstacle, and when a start timing of the steering operation (referred to as automatic steering) is too early, the automatic steering interferes with the steering wheel operation performed by the driver. For example, under a state where the driver recognizes the existence of an obstacle and intends to perform the steering operation when the obstacle and the own vehicle become close to each other, the automatic steering may be started before the steering wheel operation. In this case, the driver may feel a sense of discomfort. Thus, when the collision avoidance steering control is carried out, the automatic steering needs to be started at a timing at which the obstacle and the own vehicle are considerably close to each other. In this case, the steered wheels need to be quickly steered, and the gradient K1 of the steering torque command value Tr1(n) thus needs to be set to a large value. Moreover, the gradient K1 of the steering torque command value Tr1(n) also needs to be set to a large value in order to respond to a suddenly appearing obstacle.

Moreover, when the automatic steering is carried out in the collision avoidance steering control, the own vehicle needs not only to avoid an obstacle targeted by the collision avoidance, but also to avoid interfering with travel of another vehicle or the like existing around the own vehicle as a result of the path change. By considering those requirements, the final steering amount needs to be appropriately restricted. Therefore, the upper limit value Trmax1 of the steering torque command value Tr1(n) needs to be set to a relatively small value.

On the other hand, the lane travel support control carried out by the lane travel support system is the control of steering the steered wheels so that the own vehicle travels along a road, and thus, the control of steering the steered wheels needs to be carried out based on an entire road shape extending to a far position, and not so much based on a road shape immediately before the own vehicle. Thus, the lane travel support control does not need to steer the steered wheels quickly. Moreover, the lane travel support control is not carried out in an emergency, which is different from the collision avoidance steering control. Therefore, when the steered wheels are quickly steered by the lane travel support control, the driver tends to feel the sense of discomfort. Accordingly, the gradient K2 of the steering torque command value Tr2(n) should not be set to a large value as that for the collision avoidance steering control.

Moreover, when the lane travel support control is carried out, the steered wheels do not need to be quickly steered, but need to be steered by a large amount in response to the road shape (curvature radius). Therefore, the upper limit value Trmax2 of the steering torque command value Tr2(n) needs to be set to a relatively large value.

In view of the above, in the driving support ECU 10, the magnitude relationship of the upper limit value and the magnitude relationship of the gradient between the first calculation characteristic and the second calculation characteristic are respectively set as Trmax1<Trmax2 and K1>K2 as described before.

Figure 8:
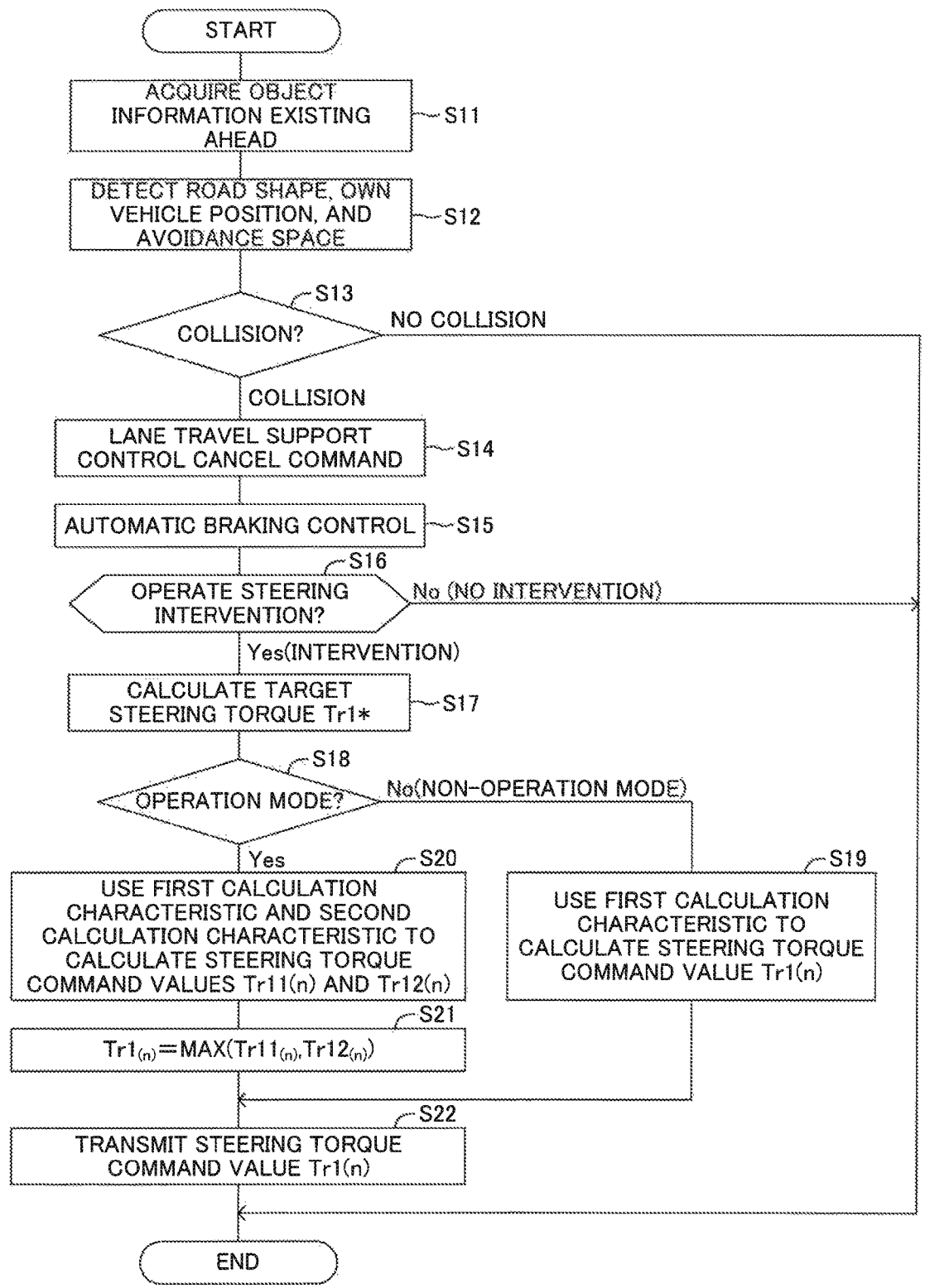
FIG. 8 is a flowchart for illustrating a collision avoidance support control routine.

A description is now given of the collision avoidance support control carried out by the collision avoidance support control section 11. FIG. 8 is a flowchart for illustrating a collision avoidance support control routine executed by the collision avoidance support control section 11. The collision avoidance support control routine is repeated every time predetermined calculation period elapses while an ignition switch is turned on.

When the collision avoidance support control routine is started, at Step S11, the collision avoidance support control section 11 acquires the object information on the region existing ahead of the own vehicle, the information being detected by the ambient sensor 14. Then, at Step S12, the collision avoidance support control section 11 determines, absence/presence of an obstacle based on the position and the direction of the own vehicle in the travel lane, the relative positions of the 3D objects with respect to the own vehicle obtained from the object information, and the like, and detects an avoidance space (avoidance target trajectory) for avoiding an obstacle.

Then, at Step S13, the collision avoidance support control section 11 uses the time to collision TTC to determine the possibility of the collision between the own vehicle and the obstacle. When the time to collision TTC is more than the collision determination threshold TTC0, that is, when the own vehicle is determined to be less likely to collide with the obstacle, the collision avoidance support control section 11 finishes the collision avoidance support control routine. The collision avoidance support control section 11 executes the collision avoidance support control routine every time predetermined calculation period elapses.

While the processing at Steps S11 to S13 is repeated, when an obstacle existing ahead of the own vehicle is detected, and the time to collision TTC of the obstacle is detected to be equal to or less than the collision determination threshold TTC0 (Yes at Step S13), at Step S14, the collision avoidance support control section 11 transmits a cancel command for inhibiting the execution of the lane travel support control to the lane travel support control section 12. When the lane travel support control section 12 receives the cancel command, the lane travel support control section 12 suspends the lane travel support control. The lane travel support control section 12 suspends the lane travel support control while receiving the cancel command every time predetermined calculation period elapses.

Then, at Step S15, the collision avoidance support control section 11 transmits the braking command for the collision avoidance to the brake ECU 20, thereby generating the friction braking forces on the front/rear left/right wheels. The braking command is a command representing, for example, the deceleration "a" calculated in accordance with Equation (4), or the upper limit value "amax." As a result, the automatic braking intervenes. In this way, the collision avoidance support control section 11 supports the driver so as to avoid the collision of the own vehicle with the obstacle.

Then, at Step S16, the collision avoidance support control section 11 makes a steering intervention operation determination representing necessity of the collision avoidance through the intervention of the automatic steering. In this case, a determination of "Yes" is made at step S16 when the two conditions described below are satisfied. One condition is that the own vehicle cannot be stopped before the obstacle by only braking through the automatic braking. The other condition is that the avoidance space (avoidance target trajectory) for avoiding the obstacle in the travel lane exists. For example, based on the deceleration of the own vehicle, the relative speed of the own vehicle with respect to the obstacle, and the distance between the own vehicle and the obstacle at the current time point, it is possible to determine whether or not the own vehicle cannot be stopped before the obstacle by only braking through the automatic braking.

When the steering intervention operation determination is "No" (No at Step S16), the collision avoidance support control section 11 finishes the collision avoidance support control routine. Then, the collision avoidance support control section 11 repeats the above-mentioned processing every time predetermined calculation period elapses. In this case, the collision avoidance support for the own vehicle and the obstacle is carried out only through the automatic braking.

On the other hand, when the steering intervention operation determination is "Yes", at Step S17, the collision avoidance support control section 11 calculates the target steering torque Tr1* for causing the own vehicle to travel along the avoidance trajectory so that the own vehicle does not collide with the obstacle.

Subsequently, at Step S18, the collision avoidance support control section 11 reads the set state of the operation switch 19, and determines whether or not the control mode in the lane travel support control is set to the operation mode, that is, whether the control mode is set to the first operation mode in which the lane keep assist control and the lane departure prevention control are carried out, or to the second operation mode in which only the lane departure prevention control is carried out by the lane travel support control section 12. In this case, the collision avoidance support control section 11 may read a signal representing the control mode from the lane travel support control section 12 in place of the set state of the operation switch 19.

When the control mode in the lane travel support control is set to the non-operation mode (No at Step S18), at Step S19, the collision avoidance support control section 11 uses the first calculation characteristic to calculate the steering torque command value Tr1(n). Thus, the collision avoidance support control section 11 calculates the steering torque command value Tr1(n) that increases so as to approach the target steering torque Tr1* based on the gradient K1 and the upper limit value Trmax1.

On the other hand, when the control mode in the lane travel support control is set to the operation mode (Yes at Step S18), at Step S20, the collision avoidance support control section 11 uses both the first calculation characteristic and the second calculation characteristic to calculate the two respective steering torque command values Tr1(n) that increase so as to approach the target steering torque Tr1*. On this occasion, the steering torque command value Tr1(n) calculated by using the first calculation characteristic is referred to as steering torque command value Tr11(n), and the steering torque command value Tr1(n) calculated by using the second calculation characteristic is referred to as steering torque command value Tr12(n). Thus, the steering torque command value Tr11(n) is a value obtained when the steering torque command value Tr1(n) is calculated based on the gradient K1 and the upper limit value Trmax1 so as to increase and approach the target steering torque Tr1*, and the steering torque command value Tr12(n) is a value obtained when the steering torque command value Tr1(n) is calculated based on the gradient K2 and the upper limit value Trmax2 so as to increase and approach the target steering torque Tr1*.

Subsequently, at Step S21, the collision avoidance support control section 11 sets one of the steering torque command value Tr11(n), and the steering torque command value Tr12(n), whichever is larger, as the steering torque command value Tr1(n).

$$Tr1(n)=\mathrm{MAX}(Tr11(n),Tr12(n))$$

Here, MAX(a,b) is a function of selecting a larger one of two parameters a and b described in parentheses.

Note that an absolute of a parameter (e.g., steering torque) which becomes positive or negative in accordance with a steering direction is used, when magnitudes the parameters are compared with each other.

After the collision avoidance support control section 11 calculates the steering torque command value Tr1(n) at Step S19 or Step S21, at Step S22, the collision avoidance support control section 11 transmits the steering torque command value Tr1(n) to the steering ECU 30, and finishes this routine. The collision avoidance support control section 11 repeats this processing every time predetermined calculation period elapses. As a result, the automatic steering operates so that the own vehicle avoids the collision with the obstacle, thereby supporting the driving of the driver. When the collision avoidance support control section 11 starts the operation of the collision avoidance, the collision avoidance support control section 11 continues to transmit the cancel command to the lane travel support control section 12 until the own vehicle stops.

A description is now given of a reason why the collision avoidance support control section 11 uses both the first calculation characteristic and the second calculation characteristic to calculate the steering torque command value Tr1(n), when the control mode of the lane travel support system is set to the operation mode.

Figure 9:
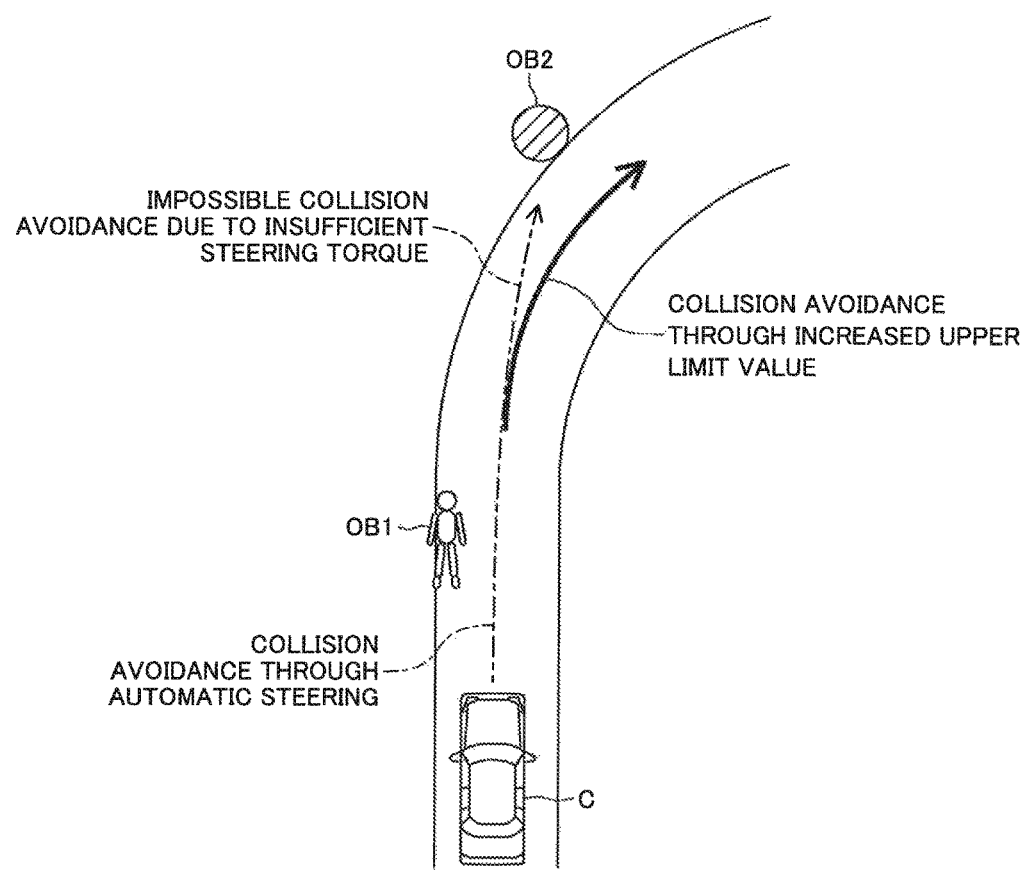
FIG. 9 is a plan view for illustrating a travel path of the own vehicle.

On this occasion, it is assumed that the collision avoidance support control section 11 calculates the steering torque command value Tr1(n) only based on the first calculation characteristic. For example, as illustrated in FIG. 9, a case is assumed where the collision avoidance support control section 11 detects an obstacle OB1 before the own vehicle C enters a curve, and carries out the automatic steering so as to avoid a collision with the obstacle OB1. In this case, the collision between the own vehicle C and the obstacle OB1 can be avoided through the automatic steering. In this case, the steering torque command value Tr1(n) is limited by the upper limit value Trmax1.

The own vehicle C avoids the collision with the obstacle OB1, and thereafter enters the curve. In this case, originally (when the obstacle OB1 does not exist), the lane travel support system operates, and the steering torque command value can thus be increased up to the upper limit value Trmax2. However, the lane travel support system is inhibited from operating by the cancel signal transmitted when the collision avoidance support control by the collision avoidance support control section 11 starts. Thus, the driving support ECU 10 cannot calculate a steering torque command value that is more than the upper limit value Trmax1. Therefore, a collision with an obstacle OB2, which could be avoided if the lane travel support system were operating, may occur.

For this reason, the collision avoidance support control section 11 is configured to use both the first calculation characteristic and the second calculation characteristic to calculate the two steering torque command values Tr11(n) and Tr12(n), and adopt one of values Tr11(n) and Tr12(n), whichever larger, as the steering torque command value Tr1(n) when the control mode in the lane travel support system is set to the operation mode. Thus, when a large steering torque comes to be necessary in the course of the collision avoidance support control as in the above-mentioned case (FIG. 9), as illustrated by the thick line of FIG. 10, the steering torque command value Tr1(n) can be increased. As a result, the collision with the obstacle OB2 can be avoided through the collision avoidance support control routine.

Figure 10:
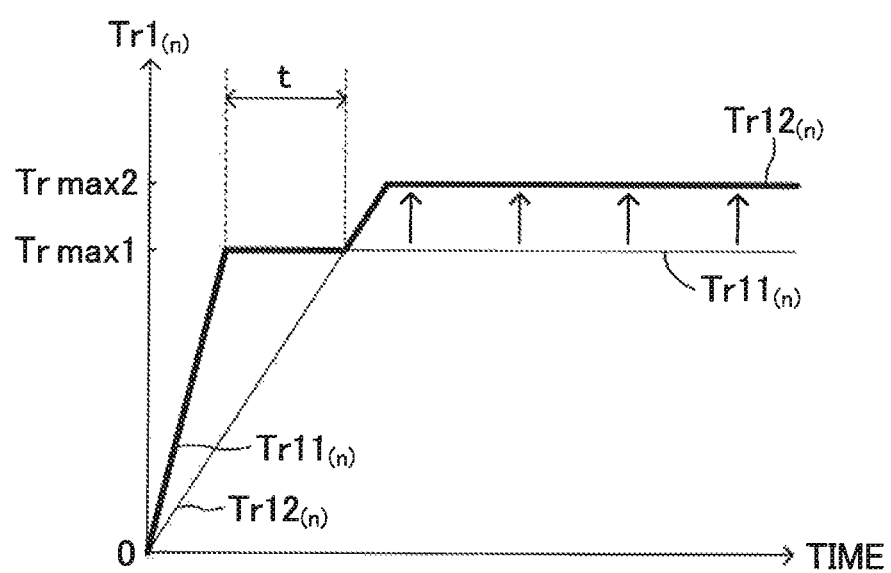
FIG. 10 is a graph for showing a transition of a steering torque command value Tr1($n$) as the thick line when the collision avoidance support control routine is executed under a state where an operation mode is set.

In this case, the upper limit value of the steering torque command value Tr1(n) does not switch to the second upper limit value immediately after the start of the automatic steering. Therefore, as illustrated in FIG. 10, the steering torque command value Tr1(n) reaches the upper limit value Trmax1, and is then maintained at the upper limit value Trmax1 until a predetermined period t elapses. Thus, the large steering control amount is finally provided by the collision avoidance support system, but a period until the steering torque command value Tr1(n) reaches the upper limit value Trmax2 is secured. As a result, the time margin for the collision avoidance operation due to the travel path change of the own vehicle can be provided for, for example, drivers of peripheral vehicles other than the object with which collision is going to be avoided.

The driving support device according to the embodiment described above provides the following effects.

1. When the steering is carried out by the collision avoidance support system, compared with when the steering is carried out by the lane travel support system, the steering control amount can be quickly increased, and the final steering control amount can be restricted so as not to be large. As a result, the collision avoidance can be carried out responsively for an obstacle that suddenly appears or the like. Moreover, the interference between the automatic steering and the steering wheel operation performed by the driver is less likely to be generated, and thus, the driver can be prevented from feeling the sense of discomfort as much as possible. Moreover, an obstruction/interference for the travel of vehicles other than the object with which collision is going to be avoided can be avoided as much as possible.

2. When the steering is carried out by the lane travel support system, compared with when the steering is carried out by the collision avoidance support system, the steering control amount can be increased over a relatively long period, and the final steering control amount can be increased. As a result, the driving support device is unlikely to provide the driver with the sense of discomfort as much as possible. Moreover, the own vehicle can be controlled to travel appropriately along the road shape.

3. When the steered wheels are steered by the collision avoidance support system, the steering control for the steered wheels by the lane travel support system is inhibited. In other words, when the own vehicle is likely to collide with an obstacle, the steering control by the collision avoidance support system is prioritized. As a result, the driver can appropriately receive the collision avoidance support.

4. When the collision avoidance steering control is carried out in the situation where the control mode in the lane travel support system is set at the operation mode, both the first calculation characteristic and the second calculation characteristic are used to calculate the two steering torque command values $Tr11(n)$ and $Tr12(n)$, and the larger one of the values $Tr11(n)$ and $Tr12(n)$ is adopted as the steering torque command value $Tr1(n)$. Therefore, there is provided the steering control amount which could be realized if the lane travel support system functioned. Thus, the collision avoidance performance can be increased.

In the above, the driving support device according to this embodiment has been described, but the present invention is not limited to the above-mentioned embodiment, and various changes are possible within the present invention.

For example, according to the above embodiment, the steering torques (target steering torque and steering torque command value) are calculated as the control amounts for the driving support ECU 10 to steer the steered wheels, but steering angles (target steering angle and steering angle command value) may be calculated in place of the steering torques. Also in this case, characteristics for setting the steering angle command value may be a first calculation characteristic acquired by assigning the steering angle command value to the vertical axis of FIG. 3 and a second calculation characteristic acquired by assigning the steering angle command value to the vertical axis of FIG. 7.

Moreover, according to the above embodiment, the collision avoidance support control section 11 is configured to use both the first calculation characteristic and the second calculation characteristic to calculate the two steering torque command values $Tr11(n)$ and $Tr12(n)$, and adopt the larger one of the values $Tr11(n)$ and $Tr12(n)$ as the steering torque command value $Tr1(n)$ when the control mode in the lane travel support system is set at the operation mode. However, the collision avoidance support control section 11 may always calculate the steering torque command value in accordance with the first calculation characteristic irrespective of the control mode in the lane travel support system. Even in this case, it is preferred that the steering control for the steered wheels by the lane travel support system be inhibited when the steering control for the steered wheels is carried out by the collision avoidance support system.

Moreover, for example, when the collision avoidance support system carries out the steering control for the steered wheels irrespective of the control mode in the lane travel support system, the larger one of the two steering torque command values $Tr11(n)$ and $Tr12(n)$ calculated using both of the first calculation characteristic and the second calculation characteristic, respectively, may be adopted as the steering torque command value $Tr1(n)$ while the steering control for the steered wheels by the lane travel support system is inhibited. Moreover, in the driving support device which does not include the means for selecting the control mode in the lane travel support system, when the collision avoidance support system carries out the steering control for the steered wheels as described above, the larger one of the two steering torque command values $Tr11(n)$ and $Tr12(n)$ calculated using both of the first calculation characteristic and the second calculation characteristic, respectively, may be adopted as the steering torque command value $Tr1(n)$, while the steering control for the steered wheels by the lane travel support system is inhibited.

What is claimed is:

1. A driving support device for a vehicle, comprising:
   a processor and memory;
   a sensor configured to detect an obstacle and a lane; and
   a steering system including left and right steered wheels, and a steering motor configured to steer the left and right steered wheels;
   wherein the processor and memory are configured to act as:
   a collision avoidance support system configured to:
      detect an obstacle existing ahead of an own vehicle, based on information from the sensor;
      calculate when said own vehicle is likely to have a collision with said detected obstacle, a first steering control command value representing a control amount of the steered wheels for avoiding said collision; and
      control the steering system to carry out steering control for said steered wheels in accordance with said first steering control command value; and
   a lane travel support system configured to:
      detect a lane in which said own vehicle is traveling, based on information from the sensor;
      calculate a second steering control command value representing a control amount of said steered wheels for maintaining a travel of said own vehicle along said lane based on a departure amount representing a degree of departure of said own vehicle from said detected lane; and
      control the steering system to carry out steering control for said steered wheels in accordance with said second steering control command value,
   wherein:
   an upper limit value of said first steering control command value is set to a first upper limit value, and an increase gradient per unit period until said first steering control command value reaches said first upper limit value is set to a first gradient of a steering angle change;

an upper limit value of said second steering control command value is set to a second upper limit value, and an increase gradient per unit period until said second steering control command value reaches said second upper limit value is set to a second gradient of a steering angle change; and said first upper limit value is set to a value less than said second upper limit value, and said first gradient is set to a value more than said second gradient.

2. The driving support device for a vehicle according to claim 1, wherein the processor and memory are further configured to inhibit said steering control for said steered wheels by said lane travel support system when said steering control for said steered wheels by said collision avoidance support system is carried out.

3. The driving support device for a vehicle according to claim 2, wherein the processor and memory are further configured to set said first steering control command value to one of a value calculated in accordance with said first upper limit value and said first gradient and a value calculated in accordance with said second upper limit value and said second gradient, whichever is larger, when said steering control for said steered wheels is carried out by said collision avoidance support system.

4. The driving support device for a vehicle according to claim 2, wherein the processor and memory are further configured to select any one of an operation mode configured to operate said lane travel support system and a non-operation mode configured to not operate said lane travel support system, wherein, when said steering control for said steered wheels is carried out by said collision avoidance support system, the processor and memory are further configured to set said first steering control command value to one of a value calculated in accordance with said first upper limit value and said first gradient and a value calculated in accordance with said second upper limit value and said second gradient, whichever is larger, under a state where said operation mode is selected, and is configured to set said first steering control command value to said value calculated in accordance with said first upper limit value and said first gradient under a state where said non-operation mode is selected.

\* \* \* \* \*